US009742741B2

(12) United States Patent
Hirayama et al.

(10) Patent No.: US 9,742,741 B2
(45) **Date of Patent: *Aug. 22, 2017**

(54) ELECTRONIC DEVICE AND METHOD OF TRANSMITTING CONTENT ITEM

(71) Applicant: KABUSHIKI KAISHA TOSHIBA, Minato-ku, Tokyo (JP)

(72) Inventors: Noriyuki Hirayama, Fuchu (JP); Takashi Kokubo, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/205,364

(22) Filed: Jul. 8, 2016

(65) Prior Publication Data

US 2016/0323252 A1 Nov. 3, 2016

Related U.S. Application Data

(63) Continuation of application No. 14/856,844, filed on Sep. 17, 2015, now Pat. No. 9,418,211, which is a (Continued)

(30) Foreign Application Priority Data

Aug. 31, 2011 (JP) ................................ 2011-189374

(51) Int. Cl.
*H04L 29/00* (2006.01)
*H04L 29/06* (2006.01)
(Continued)

(52) U.S. Cl.
CPC .......... *H04L 63/0428* (2013.01); *G06F 21/10* (2013.01); *H04L 9/30* (2013.01);
(Continued)

(58) Field of Classification Search
CPC ........... G06F 21/10; G06F 2221/2129; H04N 21/4367; H04N 21/4627; H04N 21/4408;
(Continued)

(56) References Cited

U.S. PATENT DOCUMENTS 6,981,272 B1 * 12/2005 Morinaga ........ G11B 20/00086 348/E5.006
7,233,948 B1 6/2007 Shamoon et al.
(Continued)

FOREIGN PATENT DOCUMENTS

EP 1667146 6/2006
EP 1761052 A2 3/2007
(Continued)

OTHER PUBLICATIONS

Extended European Search Report dated Feb. 7, 2013 for EP Application No. 11187999.5-1241.
(Continued)

*Primary Examiner* — Don Zhao
(74) *Attorney, Agent, or Firm* — Knobbe, Martens, Olson & Bear, LLP

(57) ABSTRACT

According to one embodiment, an electronic device includes a content transmitter. The content transmitter is configured to output a content item including first data and second data to one transmission path, by applying a first copyright protection system to copyright protection of the first data and applying a second copyright protection system to copyright protection of the second data. The first copyright protection system involves encryption of data to be copyright-protected. The second copyright protection system involves no encryption of data to be copyright-protected.

21 Claims, 9 Drawing Sheets

Related U.S. Application Data continuation of application No. 13/292,796, filed on Nov. 9, 2011, now Pat. No. 9,167,293.

(51) Int. Cl.
*H04N 21/4367* (2011.01)
*H04N 21/4627* (2011.01)
*H04N 21/4408* (2011.01)
*H04N 21/835* (2011.01)
*G06F 21/10* (2013.01)
*H04L 9/30* (2006.01)
*H04N 21/2347* (2011.01)
*H04N 21/254* (2011.01)

(52) U.S. Cl.
CPC ..... *H04N 21/2347* (2013.01); *H04N 21/2541* (2013.01); *H04N 21/4367* (2013.01); *H04N 21/4408* (2013.01); *H04N 21/4627* (2013.01); *H04N 21/835* (2013.01); *H04L 2209/24* (2013.01)

(58) Field of Classification Search
CPC ............. H04N 21/835; H04N 21/2541; H04N 21/2347; H04L 9/30; H04L 2209/24; H04L 63/0869; H04L 63/0428
See application file for complete search history.

(56) References Cited

U.S. PATENT DOCUMENTS 7,336,786 B2 * 2/2008 Takahashi .............. H04N 5/913 360/55
7,499,462 B2 * 3/2009 MacMullan .......... G06F 3/1454 348/734
7,546,023 B2 * 6/2009 Hamada ............. H04N 1/00846 380/203
7,802,311 B2 * 9/2010 Muraki ................... G06F 21/10 713/176
7,829,779 B2 * 11/2010 Suzuki ................. G10H 1/0041 726/26
7,904,928 B2 * 3/2011 Yamaguchi ............ H04H 60/17 725/111
8,031,868 B2 * 10/2011 Isozaki ............ G11B 20/00086 380/200
8,166,375 B2 * 4/2012 Saito ..................... H04L 1/0047 714/776
8,190,886 B2 * 5/2012 Suzuki .................... G06F 21/10 713/158
8,260,116 B2 * 9/2012 Miyazaki ............... H04N 5/913 386/257
8,631,509 B2 * 1/2014 Ohno ...................... G06F 21/10 713/153
9,167,293 B2 * 10/2015 Hirayama .......... H04N 21/4367
2004/0117663 A1 6/2004 Colvin
2005/0152256 A1 * 7/2005 Kikuchi ............... G11B 27/034 369/59.25
2005/0169473 A1 * 8/2005 Candelore ............ A01K 11/008 380/239
2005/0268323 A1 * 12/2005 Yamaguchi ............ H04H 60/17 725/143
2006/0020786 A1 1/2006 Helms et al.
2006/0092893 A1 * 5/2006 Champion ............. G09G 5/006 370/338
2006/0110129 A1 * 5/2006 Hamada ............. H04N 1/00846 386/260
2006/0114785 A1 * 6/2006 Ohgose ............ G11B 20/00086 369/53.2
2006/0146604 A1 * 7/2006 Muraki ................... G06F 21/10 365/185.04
2006/0171391 A1 * 8/2006 Suzuki .................... G06F 21/10 370/392
2006/0209745 A1 9/2006 MacMullan et al.
2006/0209880 A1 * 9/2006 Chang .............. H04N 21/43635 370/464
2006/0230322 A1 * 10/2006 Okazaki .................. G06F 21/10 714/49
2006/0280440 A1 * 12/2006 Miyazaki ............... H04N 5/913 386/257
2007/0009232 A1 * 1/2007 Muraki ............ G11B 20/00768 386/257
2007/0094276 A1 * 4/2007 Isaac ....................... G06F 21/10
2007/0124821 A1 * 5/2007 Saito ....................... G06F 21/10 726/27
2007/0143602 A1 * 6/2007 Saito ....................... G06F 21/10 713/166
2007/0156603 A1 7/2007 Yoon et al.
2007/0165038 A1 * 7/2007 Chiba ..................... G06F 21/10 345/520
2007/0239948 A1 * 10/2007 Muraki ............... G06F 11/1456 711/162
2008/0072072 A1 * 3/2008 Muraki ............ G11B 20/00086 713/193
2008/0148063 A1 * 6/2008 Hanko .................... G06F 21/10 713/189
2008/0288136 A1 11/2008 Itatsu
2009/0178097 A1 * 7/2009 Kim .......................... G06F 3/14 725/114
2009/0260043 A1 * 10/2009 Tatsuta ................... G09G 5/006 725/81
2009/0263102 A1 10/2009 Shimada et al.
2010/0150529 A1 * 6/2010 Leichsenring ... G11B 20/00086 386/241
2010/0166017 A1 * 7/2010 Na ...................... H04L 12/4633 370/474
2010/0199298 A1 * 8/2010 Kabuto .................. G09G 5/006 725/25
2010/0211791 A1 * 8/2010 Eckleder ................ G06F 21/10 713/172
2010/0284669 A1 11/2010 Sasaki
2011/0247086 A1 * 10/2011 Ohno ...................... G06F 21/10 726/31
2012/0159575 A1 6/2012 Fukui et al.

FOREIGN PATENT DOCUMENTS

| | | |
|---|---|---|
| JP | 2001-222858 | 8/2001 |
| JP | 2006-025436 | 1/2006 |
| JP | 2008-523725 | 7/2008 |
| JP | 2008-287386 | 11/2008 |
| JP | 2009-071786 | 4/2009 |
| WO | WO 03/058376 | 7/2003 |
| WO | WO 2006/063194 A2 | 6/2006 |

OTHER PUBLICATIONS

European Search Report issued by European Patent Office on Jul. 18, 2013 in the corresponding European Patent Application No. 11 187 999.5-1905.
Japanese Office Action dated Jan. 17, 2012 for Japanese Application No. 2011-189374.
Microsoft, "Windows Digital Audio Protection," Microsoft Corporation. May 12, 2008. 6 pages. (Online version: http://www.microsoft.com/whdc/device/audio/digital-aud_protect.mspx).
Extron Electronics, "HDPA-A Technical Overview," Revision 1.0, Jun. 11, 2009, 7 pages.
High-bandwidth Digital Content Protection System: Interface Independent Adaptation, Rev. 2.1. Published by Digital Content Protection LLC; Jul. 18, 2011. 72 pages.
Summons to attend oral proceedings pursuant to Rule 115(1) EPC for European Application No. 11187999.5-1905 with Preliminary Opinion Summary, dated Jun. 14, 2016.

* cited by examiner

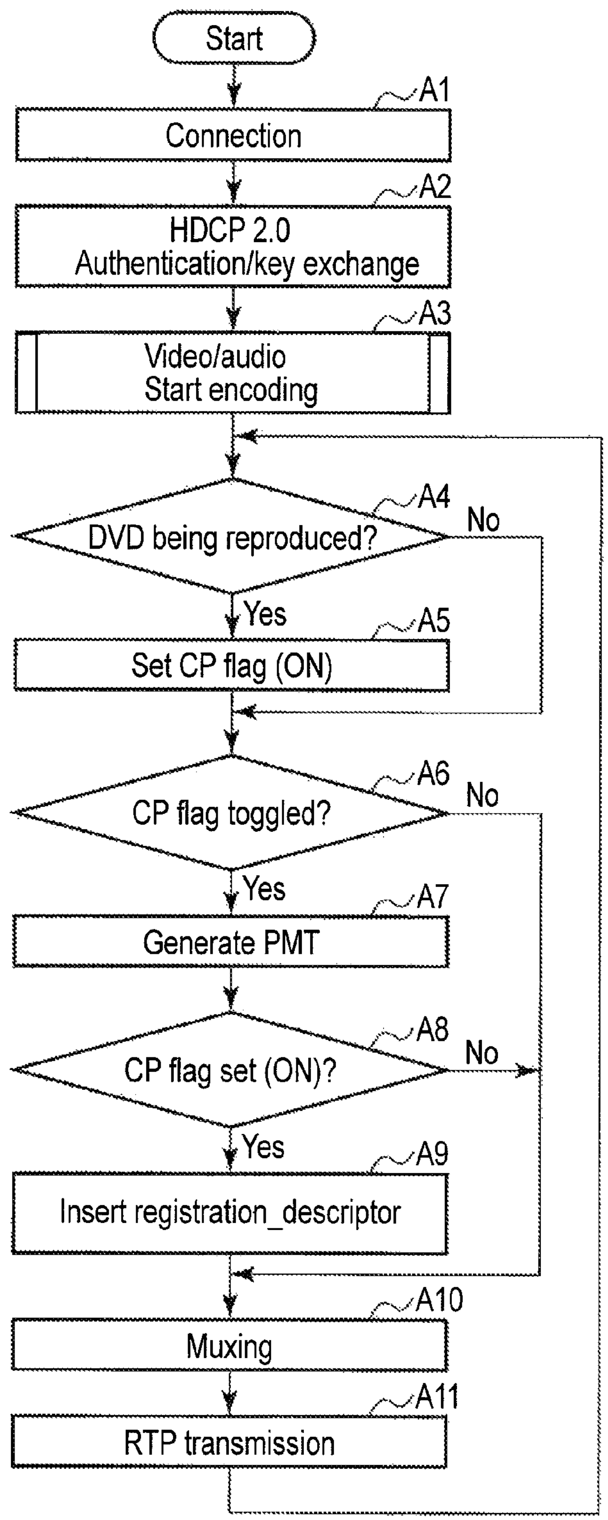
F I G. 2

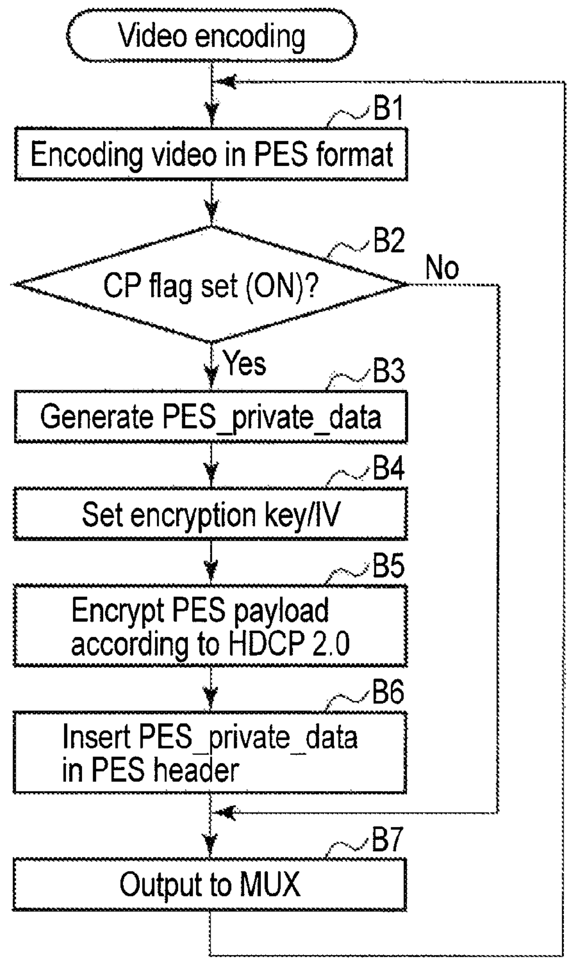
F I G. 3
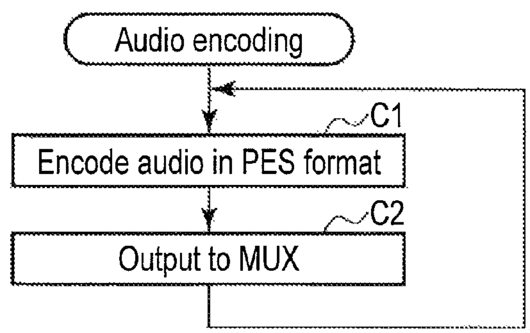
F I G. 4

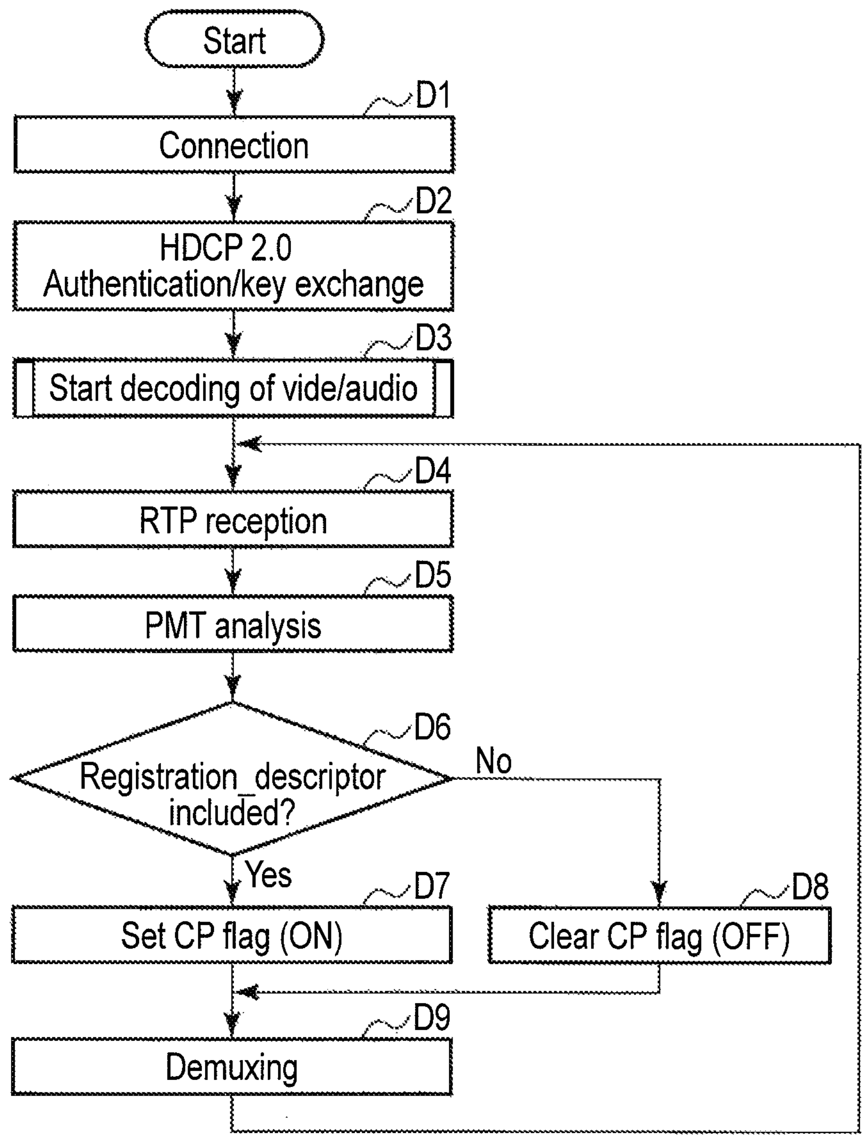
F I G. 5

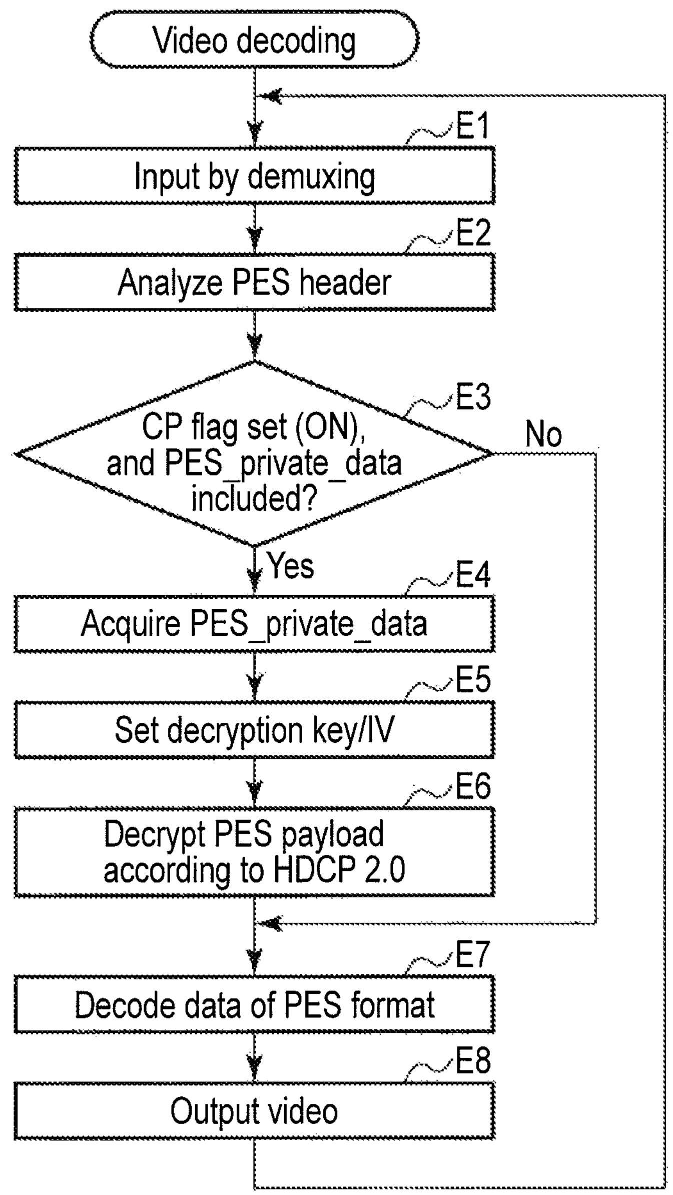
F I G. 6

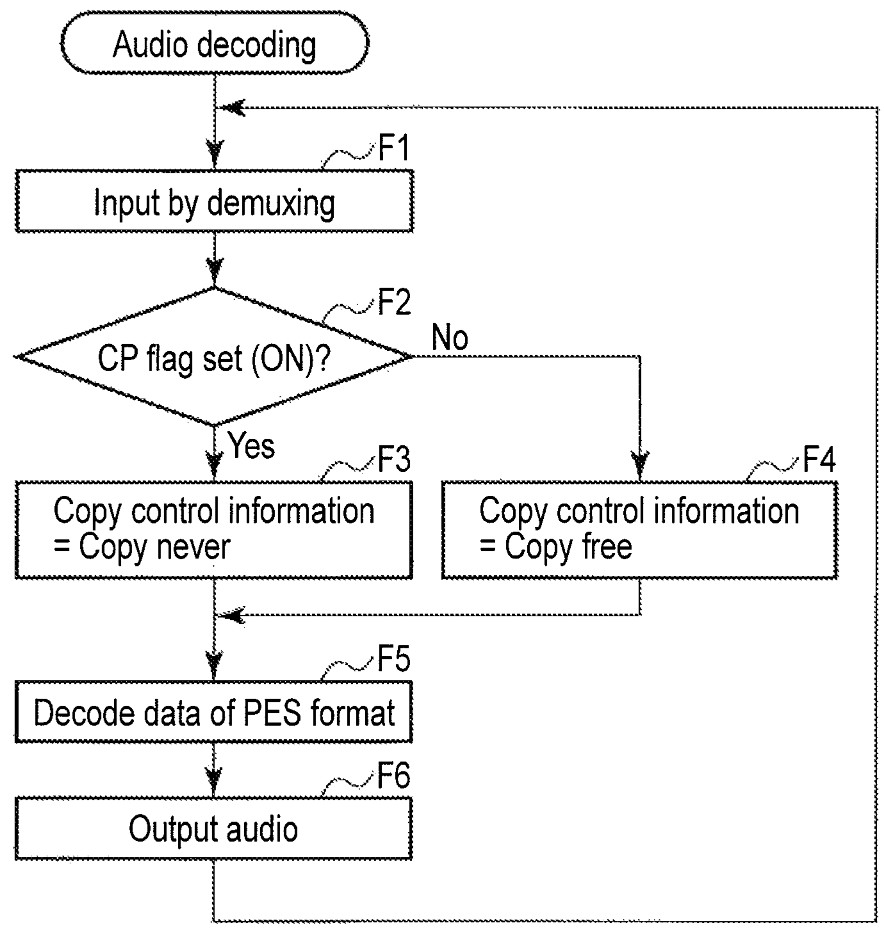
F I G. 7

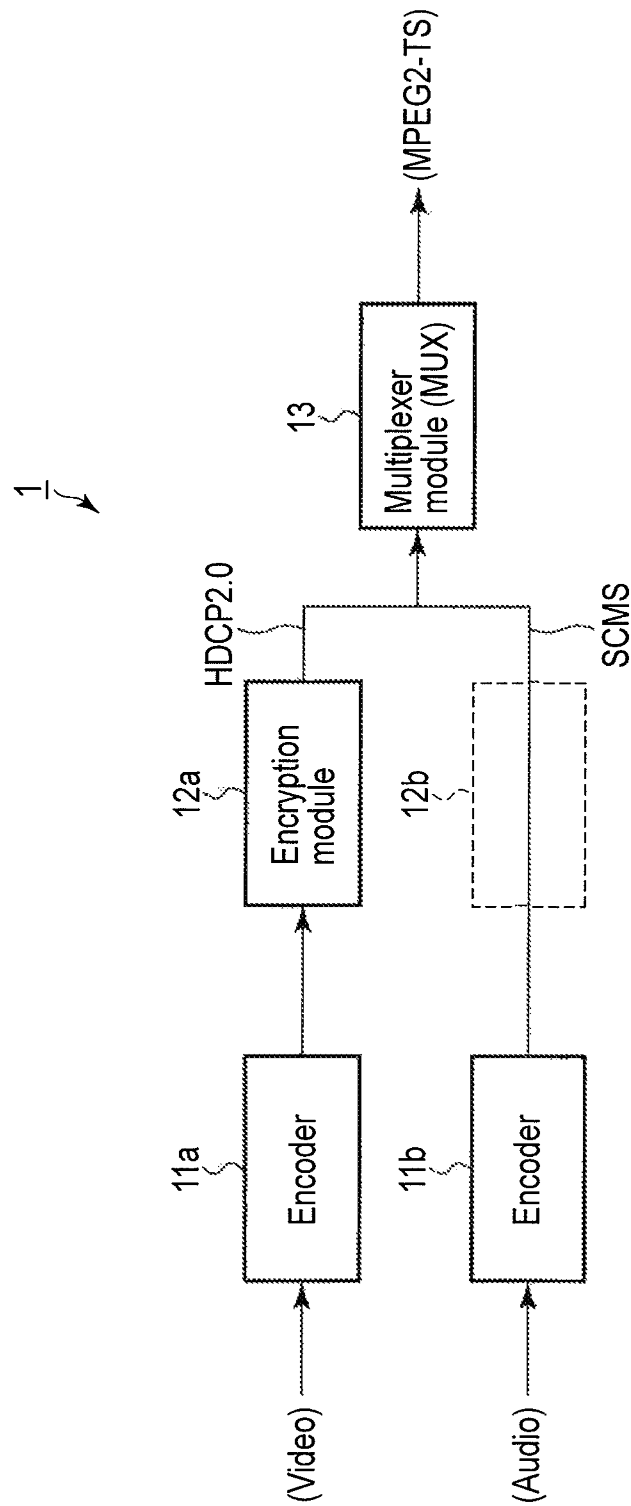
F I G. 8

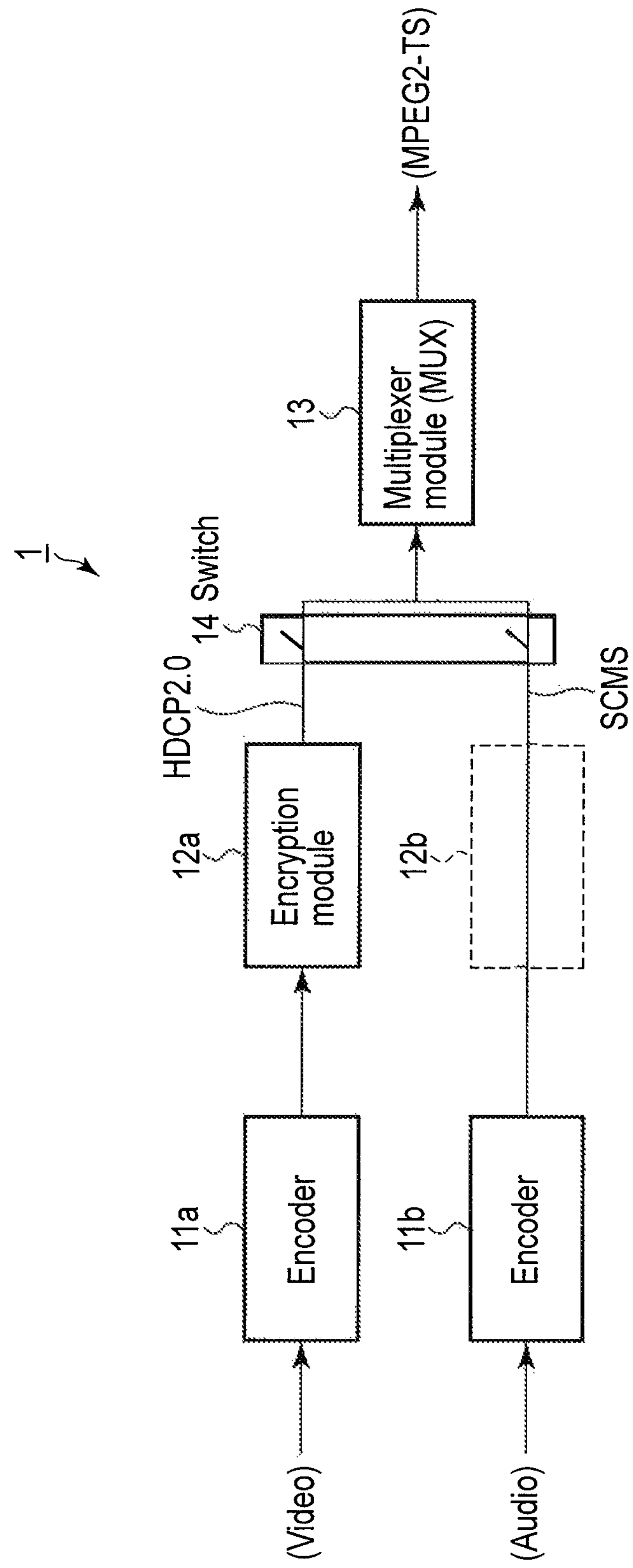
F I G. 10

ELECTRONIC DEVICE AND METHOD OF TRANSMITTING CONTENT ITEM

CROSS-REFERENCE TO RELATED APPLICATIONS

This application is a continuation of U.S. patent application Ser. No. 14/856,844, filed Sep. 17, 2015 and titled "ELECTRONIC DEVICE AND METHOD OF TRANSMITTING CONTENT ITEM," which is a continuation of U.S. patent application Ser. No. 13/292,796, filed Nov. 9, 2011 and titled "ELECTRONIC DEVICE AND METHOD OF TRANSMITTING CONTENT ITEM," which is hereby incorporated by reference in its entirety herein and which is based upon and claims the benefit of priority from prior Japanese Patent Application No. 2011-189374, filed Aug. 31, 2011, the entire contents of which are incorporated herein by reference.

FIELD

Embodiments described herein relate generally to a content transmission technique configured to transmit a content item a copyright of which requires protection through a transmission path such as a local area network (LAN) or the like.

BACKGROUND

In recent years, electronic devices capable of handling a digitalized video or audio such as personal computers and smartphones have become widespread. An electronic device of this type generally incorporates therein a data communication function, and is capable of transmitting/receiving audio-visual (AV) content between itself and other electronic devices.

On the other hand, among the AV content items, there are quite a number of content items the copyright of which requires protection by, for example, limiting duplication. Accordingly, various contrivances configured to transmit/receive AV content items between a plurality of electronic devices while effecting copyright protection have hitherto been proposed.

As a system configured to protect a visual copyright, for example, the high-bandwidth digital content protection system (HDCP) is known. Further, as a system configured to protect an audio copyright, for example, the serial copy management system (SCMS) is known. The HDCP is a system involving encryption of data to be copyright-protected, and the SCMS is a system involving no encryption of data to be copyright-protected. Accordingly, regarding the video and audio included in one AV content item, although the object of copyright protection is common to both of them, a case where they differ from each other in degree of countermeasure to be required as copyright protection, such as a case where encryption is required of one of them, whereas so far as encryption is not required of the other one is conceivable.

Incidentally, heretofore, only one copyright protection system has been adopted to transmit one AV content item to one transmission path, and adopting a plurality of copyright protection systems to transmit one AV content item to one transmission path has not totally been conceived. Accordingly, for example, it has been necessary to subject even the audio of which so far as encryption is not required to encryption to be required of only the video. In such a case, however, in the electronic device on each of both the transmission side and reception side of the AV content, a useless increase in cost resulting from incorporating therein a module (which is originally unnecessary) configured to encrypt/decrypt the audio is brought about.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 2 is an exemplary flowchart showing operation procedures on the content transmitter side of the copyright-protected content transmission system of the first embodiment.

FIG. 3 is an exemplary flowchart showing procedures of video encoding processing to be executed by the content transmitter of the copyright-protected content transmission system of the first embodiment.

FIG. 4 is an exemplary flowchart showing procedures of audio encoding processing to be executed by the content transmitter of the copyright-protected content transmission system of the first embodiment.

FIG. 5 is an exemplary flowchart showing procedures on the content receiver side of the copyright-protected content transmission system of the first embodiment.

FIG. 6 is an exemplary flowchart showing procedures of video decoding processing to be executed by the content receiver of the copyright-protected content transmission system of the first embodiment.

FIG. 7 is an exemplary flowchart showing procedures of audio decoding processing to be executed by the content receiver of the copyright-protected content transmission system of the first embodiment.

FIG. 8 is an exemplary view showing functional blocks of a transmission function of a content item provided with copyright protection, the transmission function being incorporated in the content transmitter of the copyright-protected content transmission system of the first embodiment.

FIG. 10 is an exemplary view showing functional blocks of a transmission function of a content item provided with copyright protection, the transmission function being incorporated in a content transmitter of the copyright-protected content transmission system of the second embodiment.

DETAILED DESCRIPTION

Various embodiments will be described hereinafter with reference to the accompanying drawings.

In general, according to one embodiment, an electronic device includes a content transmitter. The content transmitter is configured to output a content item including first data and second data to one transmission path, by applying a first copyright protection system to copyright protection of the first data and applying a second copyright protection system to copyright protection of the second data. The first copyright protection system involves encryption of data to be copyright-protected. The second copyright protection system involves no encryption of data to be copyright-protected.

First Embodiment

First, a first embodiment will be described below.

Figure 1:
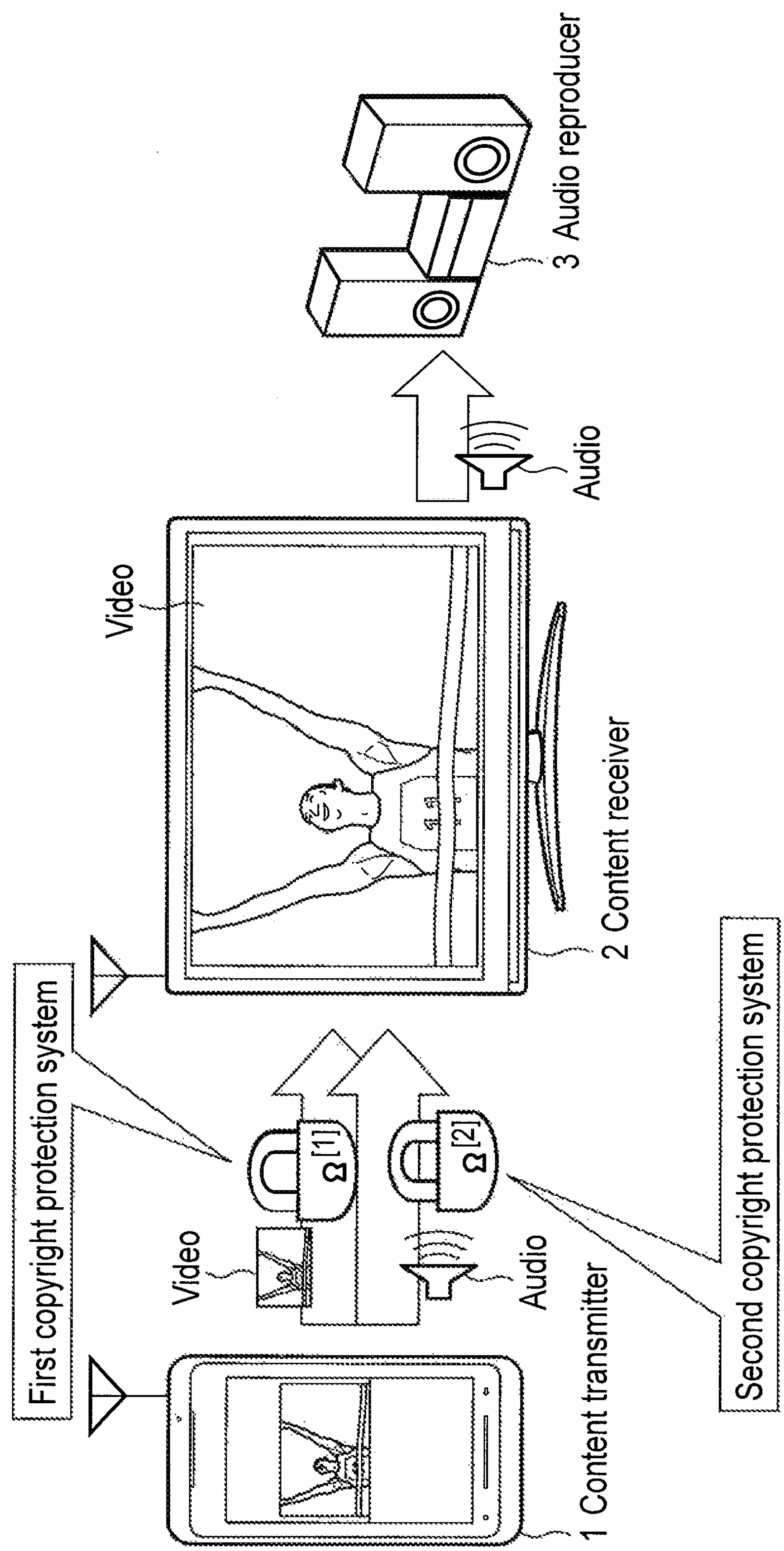
FIG. 1 is an exemplary view showing a system configuration of a copyright-protected content transmission system according to a first embodiment.

FIG. 1 is an exemplary view showing a system configuration of a copyright-protected content transmission system according to this embodiment.

As shown in FIG. 1, the copyright-protected content transmission system of this embodiment is constituted of a content transmitter 1, content receiver 2, and audio reproducer 3. It is assumed that the content transmitter 1 and the content receiver 2 are connected to each other by, for example, a wireless LAN (Wi-Fi) of IEEE 802.11, and the content receiver 2 and the audio reproducer 3 are connected to each other by, for example, S/PDIF.

The content transmitter 1 is, for example, a personal computer (PC), encodes the content item (video to be output to a display or the like, and audio to be output to a speaker or the like), and thereafter transmits the encoded content item to the content receiver 2 by Wi-Fi.

The content receiver 2 is, for example, a TV receiver, decodes the (encoded) content item received from the content transmitter 1, and displays the video on a screen. Regarding the audio, it is output, after this decoding, from a speaker incorporated in the content receiver 2 or the audio reproducer 3 via S/PDIF.

The data format of the content item to be transmitted between the content transmitter 1 and content receiver 2 is, for example, the MPEG2-TS format, and the transmission protocol is, for example, the real-time transport protocol (RTP). Further, the copyright-protected content transmission system of this embodiment applies, for example, the high-bandwidth digital content protection system (HDCP) 2.0 or a succeeding standard of the HDCP 2.0 as the copyright protection system (first copyright protection system) configured to protect the video ES, and applies, for example, the serial copy management system (SCMS) as the copyright protection system (second copyright protection system) configured to protect the audio ES. That is, in transmitting one content item through one transmission path, the copyright-protected content transmission system of this embodiment applies a plurality of copyright protection systems to the one content item.

First, with reference to FIG. 2, operations on the content transmitter 1 side among procedures in the copyright-protected content transmission system of this embodiment from transmission of the video and audio to be carried out by the content transmitter 1 to reproduction of the video and audio to be carried out by the content receiver 2 will be described below.

After the power supply of the content transmitter 1 is turned on, when a content transmission application (program) is activated by a user operation, the content transmitter 1 attempts to achieve connection to the content receiver 2 via Wi-Fi. When the connection to the content receiver 2 is established (block A1), the content transmitter 1 executes processing of authentication and key exchange conforming to the HDCP 2.0 between itself and the content receiver 2 (block A2). Thereby, the encryption key for the video ES to be used when the content item provided with copyright protection (content item the copyright of which requires protection) is transmitted, and part ($r_{iv}$) of the initial vector (IV) are determined.

The content transmitter 1 starts encoding of the video to be output to a display or the like, and audio to be output to a speaker or the like (block A3). Regarding details of the encoding processing of the video, and encoding processing of the audio, a description will be given later by using FIG. 4 and FIG. 5. For example, when a content item provided with copyright protection, and written to a DVD is being reproduced by using, for example, a DVD player application or the like (YES in block A4), the content transmitter 1 sets a copy protection (CP) flag as determination of whether or not to require copyright protection (block A5). It should be noted that here the specification stating that the content item to be transmitted should be reproduced by the content transmitter 1, and the reproduced content item should be re-encoded and transmitted to the content receiver 2 is made the premise, and hence although it is determined whether the CP flag is set or clear on the basis of presence/absence of reproduction of the DVD for the sake of simplification, copyright protection information embedded in the DVD itself may also be added to the determination criterion.

Immediately after the activation of the content transmission application, either when the CP flag is cleared or set (YES in block A6), the content transmitter 1 generates a program map table (PMT) describing a PID of each of the video ES and audio ES (block A7) and, further when the CP flag is set (YES in block A8), the content transmitter 1 inserts a registration_descriptor specified by the HDCP 2.0 in the PMT (block A9). The content transmitter 1 inserts an MPEG2-TS packet including the generated PMT in the content data to be transmitted to the content receiver 2. The PMT may also be generated at intervals of a predetermined period such as one second or the like in order to confirm stream information on the content receiver 2 side, and may be inserted in the content data. The PMTs generated by the above operation are of the same data as long as the CP flag is not toggled.

Subsequently, the content transmitter 1 generates content data of the MPEG2-TS format by the multiplexing (MUX) processing by using content data of the PES format generated by video encoding and audio encoding to be described later (block A10), and transmits the generated content data to the content receiver 2 according to the RTP (block A11). While the content transmission application is operated, the content transmitter 1 repeats the above-mentioned operations in sequence.

FIG. 3 is an exemplary flowchart showing procedures of video encoding processing.

The content transmitter 1 first encodes, in the PES format, the video output to the display or the like in accordance with a codec such as the H.264 or the like (block B1).

When the CP flag is set (YES in block B2), the content transmitter 1 determines inputCtr, streamCtr specified by the HDCP 2.0 which is part of the initial vector, and generates PES_private_data specified also by the HDCP 2.0 (block B3). Next, the content transmitter 1 combines the determined inputCtr, streamCtr, and the encryption key and part ($r_{iv}$) of the initial vector generated by the key exchange processing (block A2) with each other to set the encryption key and initial vector (block B4). The content transmitter 1 encrypts the PES payload according to the AES-CTR system employed in the HDCP 2.0 (block B5), and inserts the generated PES_private_data in the PES header (block B6). Further, the content transmitter 1 outputs the generated video PES to the MUX (block B7). While the content transmission application is operated, the content transmitter 1 repeats the above-mentioned operations in sequence.

FIG. 4 is an exemplary flowchart showing procedures of audio encoding processing.

The content transmitter 1 first encodes, in the PES format, the audio output to the speaker or the like in accordance with a codec such as the AAC or the like (block C1). The content transmitter 1 outputs the generated audio PES to the MUX (block C2). While the content transmission application is operated, the content transmitter 1 repeats the above-mentioned operations in sequence.

It should be noted that when Wi-Fi connection is carried out in accordance with the WPA system or the like, the part on the transmission path is encrypted although it is not encrypted as the audio PES, and the content data is transmitted. That is, in this case, the whole content data of the MPEG2-TS format including the audio ES is encrypted.

Next, with reference to FIG. 5, operations on the content receiver 2 side among procedures in the copyright-protected content transmission system of this embodiment from transmission of the video and audio to be carried out by the content transmitter 1 to reproduction of the video and audio to be carried out by the content receiver 2 will be described below.

After the power supply of the content receiver 2 is turned on, when switching of the mode to the content transmission mode is carried out by a user operation, the content receiver 2 waits for connection thereto from the content transmitter 1 via Wi-Fi to be carried out. When a connection request from the content transmitter 1 is received, and the connection to the content transmitter 1 is established (block D1), the content receiver 2 executes the processing of authentication and key exchange conforming to the HDCP 2.0 between itself and the content transmitter 1 (block D2). Thereby, the encryption key for the video ES to be used when the content item provided with copyright protection is transmitted, and part ($r_{iv}$) of the initial vector are determined.

The content receiver 2 starts decoding of the video and audio (block D3). Regarding details of the decoding processing of the video, and decoding processing of the audio, a description will be given later by using FIG. 6 and FIG. 7.

The content receiver 2 receives the content data transmitted from the content transmitter 1 according to the RTP (block D4), and analyzes the PMT (block D5). When a registration_descriptor is included in the PMT (YES in block D6), the content receiver 2 sets the CP flag (block D7) and, on the other hand, when a registration_descriptor is not included in the PMT (NO in block D6), the content receiver 2 clears the CP flag (block D8). The content receiver 2 subjects the MPEG2-TS packet to filtering by using stream information obtained by analyzing the PMT to thereby DEMUX (separate) the video ES, and audio ES from the content data (block D9). While the content item is transmitted from the content transmitter 1, the content receiver 2 repeats the above-mentioned operations in sequence.

FIG. 6 is an exemplary flowchart showing procedures of video decoding processing.

When the video ES is input by the above DEMUX operation (block E1), the content receiver 2 analyzes the PES header (block E2). When the CP flag is set, and a PES_private_data is included therein (YES in block E3), the content receiver 2 acquires the PES_private_data (block E4), and combines the inputCtr, StreamCtr extracted from the PES_private_data, a decryption key for the video ES generated by the key exchange processing, and part ($r_{iv}$) of the initial vector with each other to set the decryption key and initial vector (block E5). Further, the content receiver 2 decrypts the encrypted PES payload according to the AES-CTR system employed in the HDCP 2.0 (block E6).

Subsequently, the content receiver 2 decodes the content data of the PES format (block E7), and outputs the video to the display or the like (block E8). While the content item is transmitted from the content transmitter 1, the content receiver 2 repeats the above-mentioned operations in sequence.

FIG. 7 is an exemplary flowchart showing procedures of audio decoding processing.

When the audio ES is input by the DEMUX operation (block F1), if the CP flag is set (YES in block F2), the content receiver 2 sets "copy never" as copy control information of the SCMS (block F3) and, on the other hand, if the CP flag is clear (NO in block F2), the content receiver 2 sets "copy free" as copy control information of the SCMS (block F4). That is, in the copyright-protected content transmission system of this embodiment, the registration_descriptor (configured to notify whether or not to require copyright protection of the video) specified by the HDCP 2.0 which is the first copyright protection system to be applied to copyright protection of the video is utilized also as information configured to notify whether or not to require copyright protection of the audio to which the SCMS that is the second copyright protection system is applied.

Subsequently, the content receiver 2 decodes the content data of the PES format (block F5), and outputs the decoded content data to the audio reproducer 3 together with the set copy control information (block F6). While the content item is transmitted from the content transmitter 1, the content receiver 2 repeats the above-mentioned operations in sequence.

The audio reproducer 3 outputs the audio data received from the content receiver 2 to the speaker or the like, and further carries out copy control of the audio in accordance with the copy control information received from the content receiver 2.

As described above, the copyright-protected content transmission system of this embodiment applies a plurality of copyright protection systems to one content item. As has been exemplified in the above description, when the HDCP 2.0 is applied to copyright protection of the video, and the SCMS is applied to copyright protection of the audio, it is possible on the content transmitter 1 side to make a module (12*b*) configured to encrypt/decrypt the audio unnecessary as shown in FIG. 8 under the condition that encryption of the video is required. Likewise, on the content receiver 2 side too, it is possible to make a module configured to encrypt/decrypt the audio unnecessary. That is, the copyright-protected content transmission system of this embodiment realizes the transmission function of the content item provided with copyright protection at a low cost.

It should be noted that in the above description, although an example in which presence/absence of the registration_descriptor specified by the HDCP 2.0 (to be applied to the video) is utilized as copy control of the audio (applying the SCMS) has been shown, copy control information may be notified from the content transmitter 1 to the content receiver 2 by communication based on the real time streaming protocol (RTSP) or the like either when the CP flag is cleared immediately after the content transmission application is started on the content transmitter 1 side or when the CP flag is set. The content receiver 2 switches copy control information to be output to the audio reproducer 3 in accordance with the received copy control information.

Further, here, although the copy control information is treated as only one of "copy never" and "copy free", a case where "copy once" is handled is conceivable depending on the content item to be reproduced on the content transmitter 1 side.

Second Embodiment

Next, a second embodiment will be described below.

Figure 9:
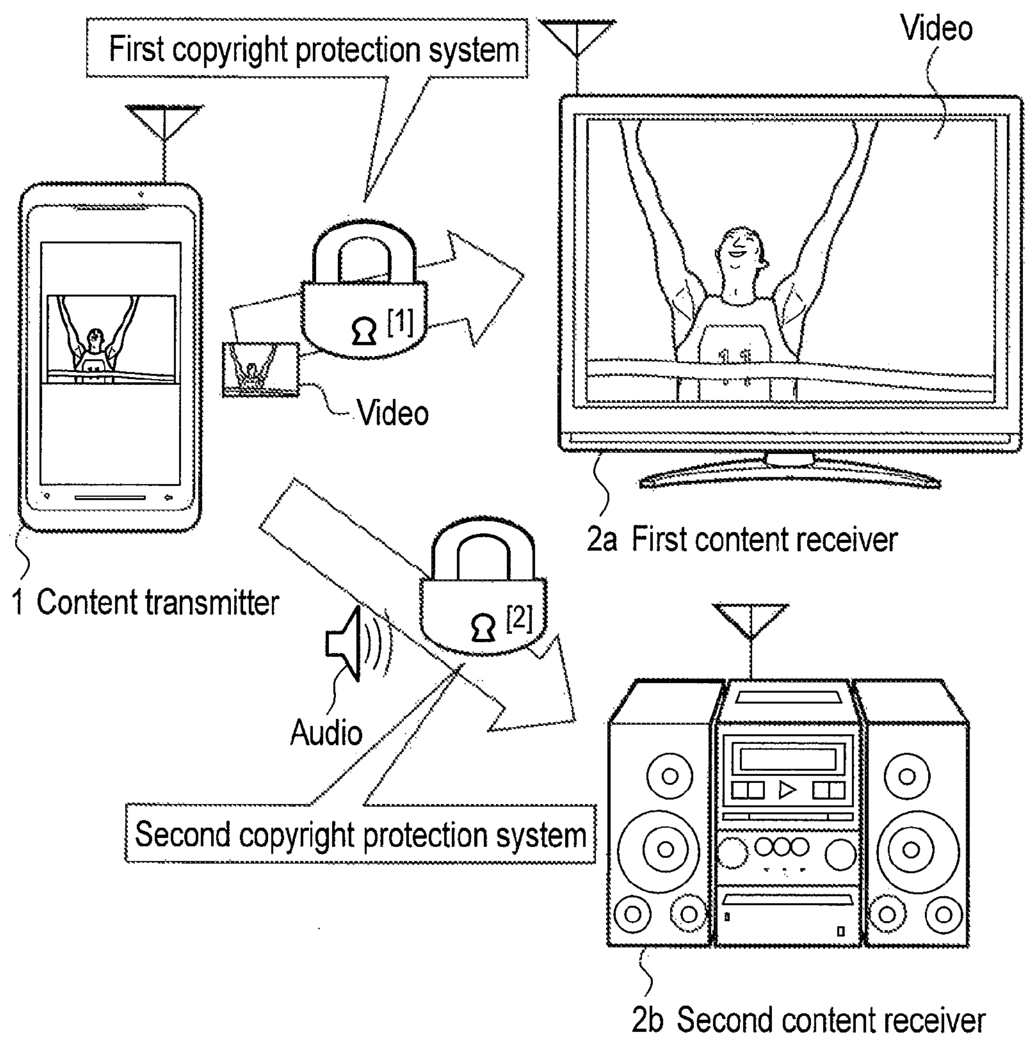
FIG. 9 is an exemplary view showing a system configuration of a copyright-protected content transmission system according to a second embodiment.

FIG. 9 is an exemplary view showing a system configuration of a copyright-protected content transmission system according to this embodiment.

The second embodiment differs from the first embodiment in that the video and audio are transmitted from a content transmitter 1 to different transmission destination devices separate from each other. As shown in FIG. 9, in the copyright-protected content transmission system of this embodiment, the content transmitter 1 transmits the video to a first content receiver 2*a*, and transmits the audio to a second content receiver 2*b*. The first content receiver 2*a* is, like the first embodiment, for example, a TV receiver, and the second content receiver 2*b* is, for example, an AV amplifier.

Operations of the content transmitter 1 of this embodiment are basically identical to the operations of the content transmitter 1 of the first embodiment. However, the operations of the content transmitter 1 of this embodiment differ from those of the first embodiment in the following points.

(a) that connection is established respectively between itself and the first content receiver 2*a*, and between itself and the second content receiver 2*b*

(b) that authentication/key-exchange processing of the HDCP 2.0 is unnecessary between itself and the second content receiver 2*b*

(c) that each content data item to be transmitted to the first content receiver 2*a*, and each content data item to be transmitted to the second content receiver 2*b* is generated in the MPEG2-TS format, only the video ES is included, as the ES, in the content data to be transmitted to the first content receiver 2*a*, and only the audio ES is included, as the ES, in the content data to be transmitted to the second content receiver 2*b*

Further, operations of each of the first content receiver 2*a*, and second content receiver 2*b* of this embodiment are basically identical to the operations of the content receiver 2 of the first embodiment. However, the operations of the first content receiver 2*a*, and second content receiver 2*b* of this embodiment differ from those of the content receiver 2 of the first embodiment in that the first content receiver 2*a* outputs only the video, and the second content receiver 2*b* outputs only the audio.

In the copyright-protected content transmission system of this embodiment in which the transmission destination of the video and audio transmitted from the content transmitter 1 is separated into the first content receiver 2*a* and second content receiver 2*b*, too, it is possible, on the content transmitter 1 side, to make a module (12*b*) configured to encrypt/decrypt the audio unnecessary as shown in FIG. 10 by applying a plurality of copyright protection systems to one content item. It is possible to generate content data including only the video ES as the ES, and content data including only the audio ES as the ES by providing, for example, a switch 14 configured to selectively supply one of the video and audio to a multiplexer module (MUX) 13. The switch 14 may also be configured in such a manner that the switch 14 can be derive-controlled to supply both the video and audio to the multiplexer module (MUX) 13.

Further, it is also possible, on the first content receiver 2*a* side, to make a module configured to encrypt/decrypt the audio unnecessary. Furthermore, it is possible, on the second content receiver 2*b* side, to eliminate the existence itself of the module for encryption/decryption. That is, the copyright-protected content transmission system of this embodiment also realizes the transmission function of the content item provided with copyright protection at a low cost.

Notification of copy control information about the audio from the content transmitter 1 to the second content receiver 2*b* may be carried out by including the registration_descriptor in the PMT of the content data to be transmitted from the content transmitter 1 to the second content receiver 2*b* or may be carried out by communication based on the RTSP or the like.

In the case where the registration_descriptor is included in the PMT, the second content receiver 2*b* sets the CP flag when the registration_descriptor is included in the PMT, and clears the CP flag when the registration_descriptor is not included in the PMT. When the audio ES is input by the DEMUX operation, the second content receiver 2*b* sets "copy never" as copy control information of the SCMS if the CP flag is set, and sets "copy free" as copy control information of the SCMS if the CP flag is clear.

On the other hand, in the case of communication based on the RTSP or the like, the second content receiver 2*b* switches the copy control in accordance with copy control information received from the content transmitter 1.

It should be noted that here an example in which the content transmitter 1 transmits content data including only the video ES as the ES to the first content receiver 2*a*, and transmits content data including only the audio ES as the ES to the second content receiver 2*b* has been shown. However, the example is not limited to this, and the same content data including both the video ES and the audio ES as the ES may be transmitted to both the first content receiver 2*a* and second content receiver 2*b* in a multicasting manner. That is, each of the first content receiver 2*a*, and second content receiver 2*b* may eclectically select ESs. In any event, the content transmitter 1 transmits the video ES and audio ES from one communication module such as a Wi-Fi module or the like to the outside.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A system comprising a first electronic apparatus and a second electronic apparatus, both the first electronic apparatus and the second electronic apparatus supporting a high-bandwidth digital content protection (HDCP), the system comprising:

the first electronic apparatus configured to:

establish a key of the HDCP with the second electronic apparatus;

encrypt video data to generate encrypted video data according to the HDCP, wherein audio data is not encrypted according to the HDCP;

multiplex the encrypted video data and the audio data to generate multiplexed data, wherein the multiplexed data comprises a descriptor indicating that the multiplexed data is protected according to the HDCP; and transmit, over a wireless, a stream of the multiplexed data to the second electronic apparatus according to a real-time transport protocol (RTP); and;

the second electronic apparatus configured to:

receive, over the wireless, the stream of the multiplexed data according to the RTP from the first electronic apparatus;

decrypt the encrypted video data; and handle the audio data as never copy to prohibit copying of the audio data, when the descriptor indicating the multiplexed data is protected according to the HDCP.

2. An electronic apparatus for transmitting a protected content comprising video data and audio data to a first electronic apparatus, the electronic apparatus supporting a high-bandwidth digital content protection (HDCP), the electronic apparatus comprising:

one or more hardware processors configured to:

establish a key of the HDCP with the first electronic apparatus supporting the HDCP;

encrypt the video data to generate encrypted video data according to the HDCP, wherein the audio data is not encrypted according to the HDCP; and multiplex the encrypted video data and the audio data to generate multiplexed data, wherein the multiplexed data comprises a descriptor indicating that the multiplexed data is protected according to the HDCP, and the audio data is handled as never copy to prohibit copying of the audio data by the first electronic apparatus; and a transmitter configured to transmit, over a wireless, a stream of the multiplexed data to the first electronic apparatus according to a real-time transport protocol (RTP).

3. The electronic apparatus of claim 2, wherein the one or more hardware processors are further configured to:

encode video of the protected content to the video data; and encode audio of the protected content to generate the audio data.

4. The electronic apparatus of claim 2, wherein the HDCP comprises at least HDCP 2.0 and later versions of HDCP 2.0.

5. The electronic apparatus of claim 2, further comprising:

a display configured to display video generated based on the video data; and a speaker configured to output audio generated based on the audio data.

6. An electronic apparatus supporting a high-bandwidth digital content protection (HDCP), the electronic apparatus comprising:

a receiver configured to receive, over a wireless, a stream of multiplexed data according to a real-time transport protocol (RTP) from a first electronic apparatus, wherein the multiplexed data comprises encrypted video data and audio data of a protected content, the encrypted video data is encrypted according to the HDCP, the audio data is not encrypted according to the HDCP, and the multiplexed data comprises a descriptor indicating whether the multiplexed data is protected according to the HDCP; and one or more hardware processors configured to:

decrypt the encrypted video data to generate video data; and handle the audio data as never copy to prohibit copying of the audio data, when the descriptor indicating the multiplexed data is protected according to the HDCP.

7. The electronic apparatus of claim 6, further comprising a transmitter configured to transmit an audio signal of the audio data to an external device, wherein the one or more hardware processors is further configured to decode the audio data to generate the audio signal.

8. The electronic apparatus of claim 7, wherein the receiver is configured to receive the multiplexed data through a first digital interface complying with a first standard, and the transmitter is configured to transmit the audio signal to the external device through a second digital interface complying with a second standard different from the first standard.

9. The electronic apparatus of claim 7, wherein the transmitter is further configured to transmit copy control data representing never copy with the audio signal.

10. The electronic apparatus of claim 6, wherein the HDCP comprises at least HDCP 2.0 and later versions of HDCP 2.0.

11. The electronic apparatus of claim 6, further comprising:

a display configured to display video generated based on the video data; and a speaker configured to output audio generated based on the audio data.

12. A method performed by an electronic apparatus for transmitting a protected content comprising video data and audio data, the electronic apparatus supporting a high-bandwidth digital content protection (HDCP), the method comprising:

establishing a key of the HDCP with a first electronic apparatus supporting the HDCP;

encrypting the video data to generate encrypted video data according to the HDCP, wherein the audio data is not encrypted according to the HDCP;

multiplexing the encrypted video data and the audio data to generate multiplexed data, wherein the multiplexed data comprises a descriptor indicating that the multiplexed data is protected according to the HDCP, and the audio data is handled as never copy to prohibit copying of the audio data by the first electronic apparatus; and transmitting, over a wireless, a stream of the multiplexed data to the first electronic apparatus according to a real-time transport protocol (RTP).

13. The method of claim 12, further comprising:

encoding video of the protected content to the video data; and encoding audio of the protected content to generate the audio data.

14. The method of claim 12, wherein the HDCP comprises at least HDCP 2.0 and later versions of HDCP 2.0.

15. The method of claim 12, further comprising:

displaying video generated based on the video data; and outputting audio generated based on the audio data.

16. A method performed by an electronic apparatus supporting a high-bandwidth digital content protection (HDCP), the method comprising:

receiving, over a wireless, a stream of multiplexed data according to a real-time transport protocol (RTP) from a first electronic apparatus, wherein the multiplexed data comprises encrypted video data and audio data of a protected content, the encrypted video data is encrypted according to the HDCP, the audio data is not encrypted according to the HDCP, and the multiplexed data comprises a descriptor indicating whether the multiplexed data is protected according to the HDCP;

decrypting the encrypted video data to generate video data; and handling the audio data as never copy to prohibit copying of the audio data, when the descriptor indicating the multiplexed data is protected according to the HDCP.

17. The method of claim 16, further comprising transmitting an audio signal of the audio data to an external device, wherein the method further comprises decoding the audio data to generate the audio signal.

18. The method of claim 17, wherein the transmitting comprises transmitting copy control data representing never copy with the audio signal.

19. The method of claim 16, wherein the HDCP comprises at least HDCP 2.0 and later versions of HDCP 2.0.

20. The method of claim 17, wherein:

the receiving comprises receiving the multiplexed data through a first digital interface complying with a first standard; and the transmitting comprises transmitting the audio signal to the external device through a second digital interface complying with a second standard different from the first standard.

21. The method of claim 16, further comprising:

displaying video generated based on the video data; and outputting audio generated based on the audio data.

* * * * *